Oct. 19, 1926.  1,603,969
H. MICHEL
TWO-STROKE CYCLE INTERNAL COMBUSTION ENGINE
Filed August 23, 1921   2 Sheets-Sheet 1
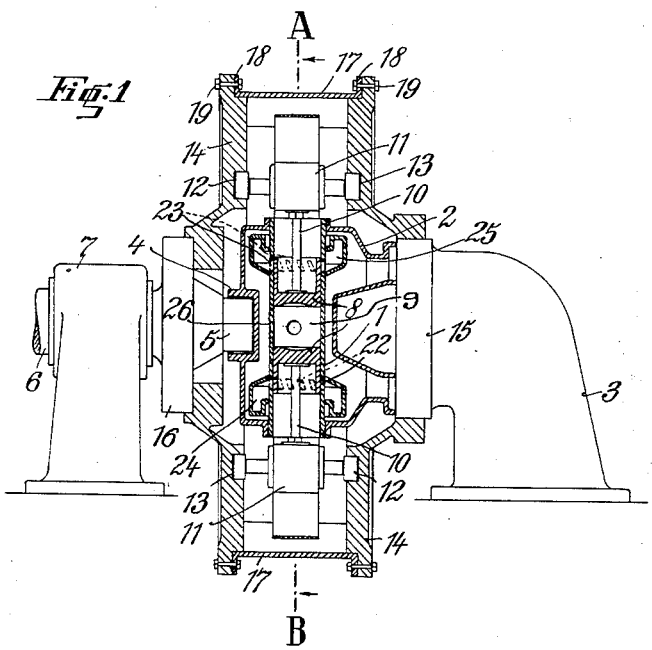
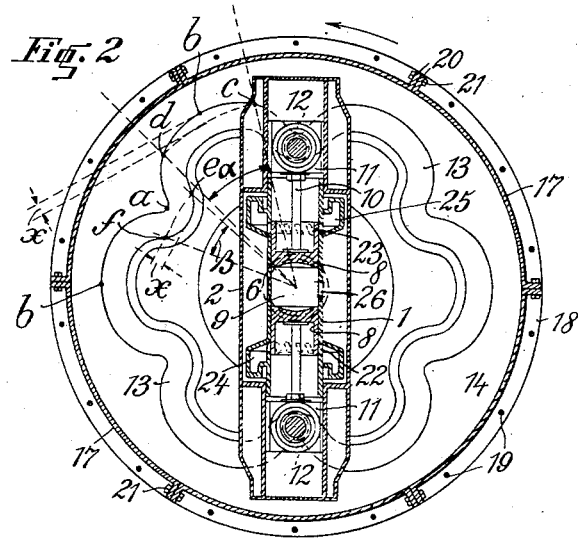
Witness
Charles A. Mathé.
Inventor:
Hermann Michel
by Lotka, Kehlenbeck & Mathé
Attorneys.

Oct. 19, 1926.  1,603,969
H. MICHEL
TWO-STROKE CYCLE INTERNAL COMBUSTION ENGINE
Filed August 23, 1921  2 Sheets-Sheet 2
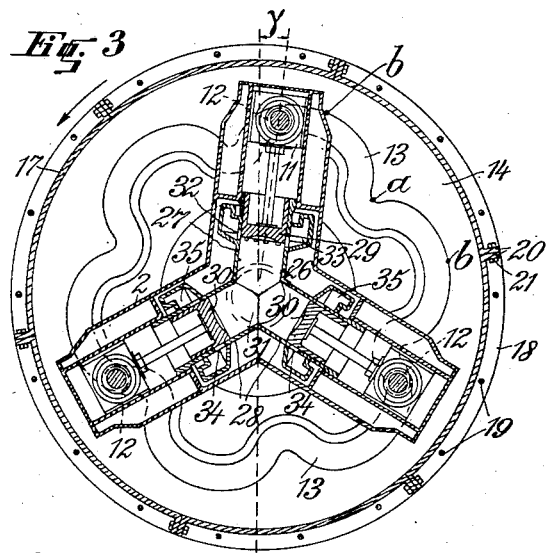
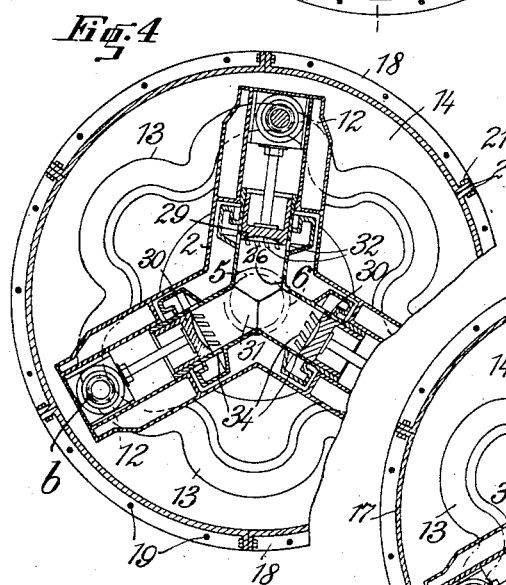
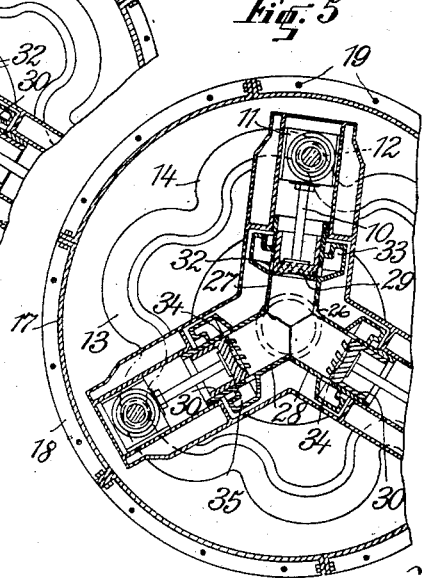

Patented Oct. 19, 1926.

1,603,969

UNITED STATES PATENT OFFICE.

HERMANN MICHEL, OF VOORDE IN HOLSTEIN, GERMANY, ASSIGNOR TO CENTRA HANDELS- & INDUSTRIE A.-G., OF CHUR, SWITZERLAND, A CORPORATION OF SWITZERLAND.

TWO-STROKE-CYCLE INTERNAL-COMBUSTION ENGINE.

Application filed August 23, 1921, Serial No. 494,540, and in Germany July 20, 1920.

My invention relates to improvements in two-stroke cycle internal combustion engines.

In connection with two-stroke cycle internal combustion engines with a plurality of pistons whose movements are controlled by a cam-way, the cylinders being stationary and the cam rotatable, or vice versa, it has been proposed to have two or more pistons working in opposite directions in a single cylinder, with a single combustion chamber. This has certain structural advantages especially in regard to the absence of cylinder heads, and with high piston speeds a very good scavenging is obtained, as the scavenging air can be made to flow through the cylinder from one end to the other without much change of direction, and the combustion is then very complete.

The object of this invention is to provide an engine of this type which can be run at a low or moderate speed, as for example for marine work, but which is nevertheless of good efficiency with cylinders of moderate size.

To this end I make the number of cam elements appertaining to each two-stroke cycle a multiple of the number of pistons. Then, with each revolution of the cam or of the cylinders the number of operations of each piston exceeds the number of pistons. The rate of revolution of the cam or cylinders can thus be low, as the multiplicity of cam elements involves or allows of, a considerable reduction of speed, but the output of each cylinder is for the same reason high, and the high piston speed enables small cylinders to be used. Small cylinders are preferable for continuous working, as they are easier to cool and less liable to crack. The engine is thus well adapted for many classes of work, especially where low speed and high efficiency are important.

Up to a certain order of piston velocities good scavenging and combustion are already obtained by the fact that the oppositely moving pistons operate in one combustion chamber, but with very high piston velocities the time available for scavenging is too short if the curvature of the cam element appertaining to the scavenging operation is based on computation made with direct reference to the operation of a crank. To secure efficient scavenging I then extend the scavenging period over a considerably larger fraction of the cycle; I do this by making the cam way at the part which operates at the end of the explosion stroke and the beginning of the compression stroke of larger radius than the part operating at the end of the compression stroke and the beginning of the explosion stroke. Thus a longer scavenging period is obtained without reducing the effective compression stroke, as would be the case if the port were merely enlarged. The cam way being made up of numerous elements plotted for specific purposes, the shape of the elements not concerned with the scavenging is not affected by modification of the scavenging elements.

As by reason of the small dimensions the cylinders are not liable to crack. The specific effect of the engine can be increased by increasing the charge or combustible mixture supplied to the cylinders. By supplying the scavenging air to the cylinders through the scavenging ports and discharging the same through the exhaust ports, the pressure within the cylinder can not rise before the exhaust ports are closed. However the exhaust ports must be opened prior to the scavenging ports in order to reduce the pressure of the expansion to the pressure within the exhaust conduit before the scavenging ports are opened. By controlling the ports by means of the pistons working in opposite directions the ports are opened and closed with the pistons in the same positions. Therefore, if the exhaust is first opened, and thereafter the scavenging ports, the scavenging ports are necessarily closed by the piston prior to the exhaust ports.

One of the objects of the improvements is to avoid this objectionable feature. With this object in view the working cylinder or cylinders containing the exhaust ports are so displaced with relation to the cylinders formed with the scavenging ports in a direction opposite to the direction of the movement of the cam or in the direction of the movement of the cylinder or cylinders, that the piston or pistons of the cylinder or cylinders having exhaust ports arrive at the outer dead center earlier than the pistons of the cylinders formed with the scavenging ports. With this construction of the cylinders the exhaust ports are first opened, and thereafter the scavenging ports, and upon the next piston stroke the exhaust ports are first closed and thereafter the scavenging ports. Therefore within the period of time after closing the exhaust ports to closing the scavenging ports air can be forced by the scavenging pump into the cylinder, so that the pressure within the cylinder is higher than that within the exhaust pipe. By thus increasing the weight of the air within the cylinder the effect of the engine is increased.

However, while both the exhaust ports and the scavenging ports are open, the pressure of the scavenging air falls off. As the ports are the narrowest parts of the conduit of the air, the air is throttled at such parts so as to lose pressure. This is particularly objectionable with reference to the scavenging ports, because the pressure supplied to the cylinder is reduced accordingly. But the throttling in the exhaust ports is not objectionable, because the exhaust ports are opened before the end of the piston stroke, so that the pressure of the expansion falls off in time. On the contrary such throttling is desirable, because also when scavenging the pressure within the cylinder is in a less degree lower than the pressure of the scavenging pump.

Therefore, it is important to increase the area of the scavenging ports. It would be useless to widen said ports axially because thereby the effective stroke volume of the piston would be reduced. In my improved construction the area of the scavenging ports is materially increased by having the number of the cylinders provided with the scavenging ports exceed that of the cylinders containing the exhaust ports.

The high speed working parts of the engine are preferably entirely enclosed in an oil-tight casing. If the cylinders are stationary and actuate, by means of the pistons, fly-wheels on which the cams are placed, efficient lubrication can be obtained, with complete enclosure, by having the cam ways on fly-wheels or disks rotating laterally of the cylinders, with a ring between them against which such disks are pressed by bolting or otherwise, to make an oil-tight chamber enclosing the cylinder, and oil introduced into this chamber can run to all the parts requiring lubrication.

In order that my invention be more clearly understood two examples embodying the same have been shown in the accompanying drawings, in which the same reference characters have been used in all the views to indicate corresponding parts. In said drawings,—

Fig. 1, is a vertical section of the engine,

Fig. 2, is a vertical section taken on the line A—B of Fig. 1,

Fig. 3, is a vertical section showing another form of the invention in which the piston of the cylinder formed with exhaust ports arrives at its dead point prior to the piston or pistons of the cylinder or cylinders provided with scavenging ports, the figure showing the parts in the positions in which the exhaust ports are open and the scavenging ports closed.

Fig. 4, is a similar section showing both the exhaust and scavenging ports open, and Fig. 5, is a similar section showing the exhaust ports closed and the scavenging ports partly open.

In the example shown in Figs. 1 and 2, the engine has a body 1 forming a pair of opposed cylinders and located in a casing 2, which is fixed on one side to a standard 3 and has on the other side a bearing 4 whereby it rests on the gudgeon 5 of a shaft 6 journaled in a standard 7. There are two pistons 8 with an explosion chamber 9 between them. The piston rods 10 have crossheads 11 with rollers 12 at their ends, working in annular cam ways 13. These cam ways are channels in two disks or fly wheels 14, one rotatably mounted on a collar 15, on the standard 3 and the other fixed to a flange 16 of the shaft 6. A ring built up of segments 17 encloses the space between the disks. The segments 17 have lateral flanges 18 whereby they abut against flanges at the rims of the disks, and are made fast by bolts 19. They also have flanges 20 at their ends, for joining them together by means of bolts 21.

The cylinder body 1 has scavenging ports 22 at one end of the combustion chamber 9, and exhaust ports 23 at the other end, these ports being exposed by the respective pistons in their end positions, on the outstroke. The ports 22 open into an annular chamber 24 to which a conduit (not shown) leading from the scavenging air and feed pump is connected. The exhaust ports open into an annular chamber 25, to which the exhaust pipe (not shown) is connected. Fuel is admitted through a port 26.

Each cam groove 13 has six equal elements *b a b*, each of which is operative for one two-stroke cycle.

When the rollers 12 are at the points *a* (the pistons being then at their inner dead points) the compressed mixture in chamber 9 is fired and the pistons then perform their power stroke, rotating the disks 14 in the direction indicated by an arrow in Fig. 2. At the end of the power stroke the rollers are at *b*. The products of combustion are exhausted through ports 23, and scavenging air is pumped in through ports 22. The pistons compress the charge while the rollers are travelling from *b* to *a*, under the influence of the cams.

There being six elements *b, a, b* the pistons perform six in-strokes and six out-strokes during each revolution of the disks 14, and there are six explosions per revolution. The power delivered by the engine is thus much higher than if there were only as many elements $b$, $a$, $b$, as there are pistons. The disks or fly-wheels, with the shaft 6, run at a moderate speed, but the piston speed is high. The cylinder body is comparatively small, and thus easy to cool and not liable to crack. The scavenging is efficient as the air has time to sweep through the cylinder body 1 from the ports 22 to ports 23.

The curvature of the part $c$—$d$ of each cam element, operative at the end of the explosion stroke and during the scavenging, is of considerably larger radius than the part $e$—$f$ operative at the end of the compression stroke and the beginning of the explosion stroke (taken with reference to the angle of rotation). Therefore, with equal piston movement $x$, the angle of rotation $\alpha$ in the one case is larger than the angle $\beta$ in the other case, and a comparatively large part of the cycle period is utilized for scavenging without detriment to the compression stroke.

In the arrangement shown in Figs. 3 to 5, the effect of the engine is increased by so constructing the engine that a higher charge of air is supplied to the cylinder, which is possible because the diameters of the cylinders are small and a higher pressure within the same is allowed.

The cylinder block or body is supported in the same way as has been described with reference to Figs. 1 and 2, but it is equipped with three cylinders 27, 28, 28 wherein three pistons 29, 30, 30 have reciprocating movement, the combustion chamber 31 being common to all the cylinders. The cylinder 27 is formed with a set of exhaust ports 32 located so as to be opened by the piston when at its outer dead point. The ports open into an annular chamber 33 connected with the exhaust pipe. The cylinders 28 are formed with scavenging ports 34 for the admission of air for scavenging and supporting combustion, said ports being located so as to be open with the pistons 30 in their dead points. The ports 34 open into annular chambers 35 communicating with a pump (not shown) which supplies such chambers with air.

The cylinders 28 formed with the scavenging ports are disposed relatively to each other at an angle of 120°. But the cylinder 27 which is formed with the exhaust ports is not disposed relatively to the cylinders 28 at angles of 120°, but it is shifted or offset from this position in the direction opposite to the rotation of the fly wheels 14 that is to say in a direction opposite to the arrow shown in the figure, at an angle $\gamma$, and it is disposed at an angle of 120°+$\gamma$ to the cylinder 28 which is situated ahead of such guide, in the direction of rotation indicated by the arrow. The angle $\gamma$ is such that the exhaust ports 32 are opened and closed the desired period of time prior to the scavenging ports 34, as will readily be understood from the following.

When performing the explosion stroke the piston 29 approaches its outer dead point corresponding to the point $b$ of the cam groove 13 prior to the pistons 30 of the cylinders 28. Therefore the exhaust ports 32 are opened by the piston 29, while the scavenging ports 34 are still closed. Therefore the products of the combustion are free to escape through the ports 32, and the pressure of the expansion can fall off substantially to the pressure of the scavenging air, before the latter is forced into the cylinder.

After the pistons 30 have come to their outer dead points corresponding to the points $b$ of the cam groove 13, as is shown in Fig. 4, the scavenging ports 34 are open, so that the pressure of the scavenging air is transmitted to the cylinders.

If now after passing through their outer dead points the pistons 30 perform their compresesion strokes, the operative parts will come to a position in which the piston 29 being ahead of the pistons 30 has already closed the exhaust ports 32, while the scavenging ports 34 are still partly open, as is shown in Fig. 5. Until the said ports have been closed by the pistons 30 the full pressure from the scavenging pump is transmitted to the air within the cylinders. By thus increasing the weight of the air within the cylinders the effect of the engine is increased.

Two of the cylinders, viz, the cylinders 28, are formed with scavenging ports 34. Therefore the area provided for the admission of the air is large and the throttling small, which likewise tends to increase the pressure of the air for scavenging and for supporting combustion.

In some cases I provide more than one cylinder with exhaust ports. But in any case the number of the cylinders provided with exhaust ports must be less than that of the cylinders provided with scavenging ports.

The closed chamber formed by the disks 14 and segments 17, encloses all the working parts. Under the influence of centrifugal force, oil introduced into this chamber is flung against the circumference thereof, to form a circular bath, and lubricating pipes for the various parts may be provided, extending into this bath. The cylinders and cam-way are thus well lubricated, and the parts are well enclosed. The bolts 19, pulling the segments 17 axially tightly against the disks 14, ensure oil-tight joints.

I claim:

1. A two-cycle internal combustion engine having a plurality of pistons, a combustion chamber common to all of said pistons, individual cylinders for said pistons, the cylinders of different pistons being provided respectively with ports for the exhaust of the combustion products and with scavenging ports for the admission of air, the cylinder having exhaust port being shifted circumferentially to an unsymmetrical position with respect to the cylinders having the scavenging ports, in such a direction that the piston moving along the cylinder having the exhaust port will reach the outer end of its stroke before the pistons moving along the cylinders having the scavenging ports, and means for controlling the reciprocating movement of said pistons.

2. A two-cycle internal combustion engine having a plurality of pistons, a combustion chamber common to all of said pistons, individual cylinders for said pistons, some of said cylinders having air-inlet ports but no exhaust ports, while another cylinder has exhaust ports but no air-inlet ports, the cylinder having the exhaust ports being shifted circumferentially to an unsymmetrical position with respect to the cylinders having the air-inlet ports, to effect an uneven spacing of such cylinders, in such a direction that the piston moving along the cylinder having the exhaust ports will reach the outer end of the stroke before the pistons moving along the cylinders having the air-inlet ports, and means for controlling the reciprocating movement of the pistons.

3. A two-cycle internal combustion engine having a plurality of cylinders mounted radially in a single plane and opening into a common combustion chamber, a piston reciprocable in each cylinder, a rotary member carrying a symmetrically arranged camway, means cooperating with said camway for controlling the movements of the pistons, a plurality of said cylinders having scavenging ports only and another of said cylinders having exhaust ports only, at least one of said cylinders being unsymmetrically positioned with respect to the others.

In testimony whereof I hereunto affix my signature.

HERMANN MICHEL.